Dec. 19, 1933.   G. K. BEDUR   1,939,872
COUPLING FOR FLEXIBLE HOSE
Filed Oct. 5, 1932
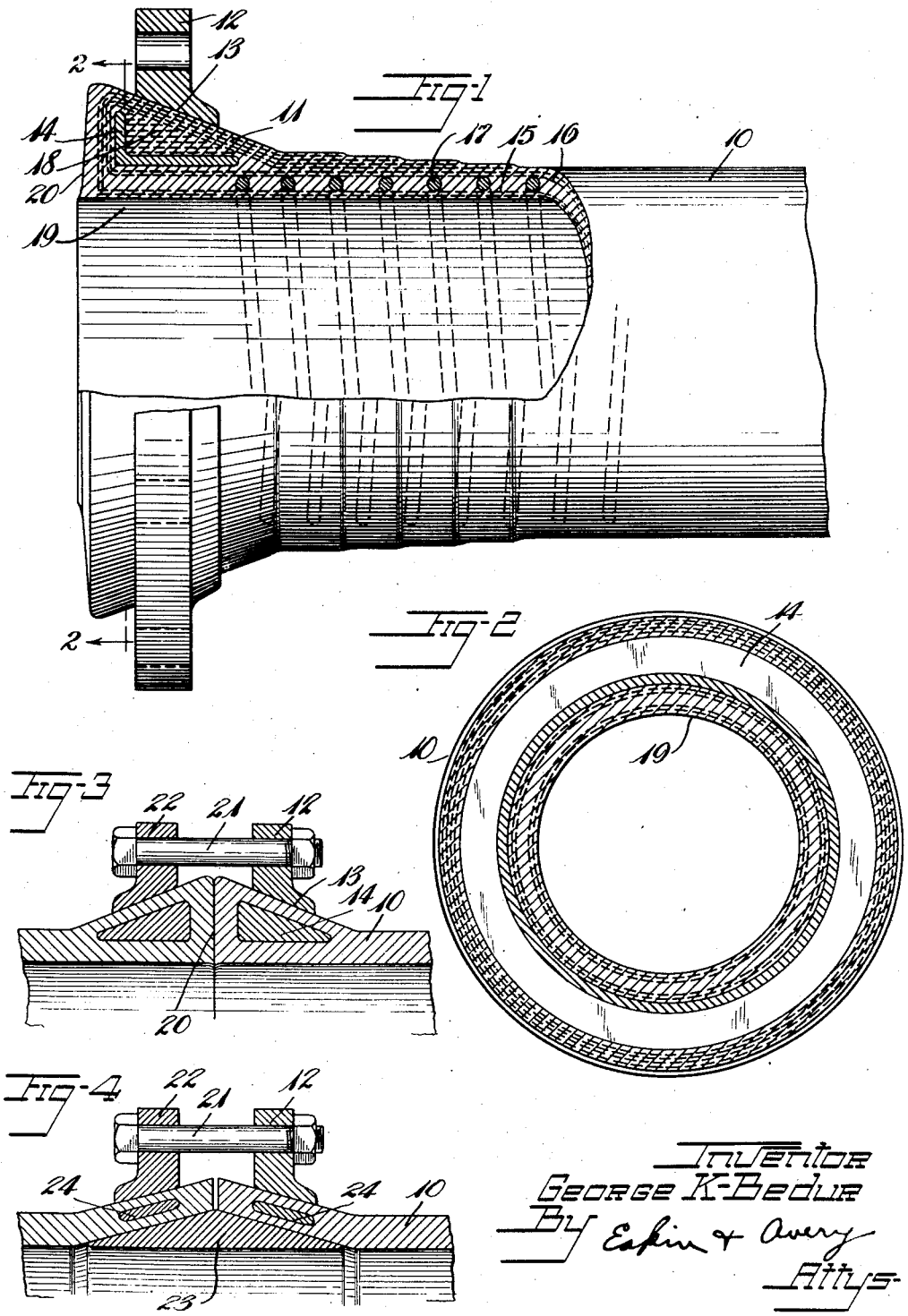
Inventor
George K. Bedur
By Eakin & Avery
Attys.

Patented Dec. 19, 1933

1,939,872

UNITED STATES PATENT OFFICE 1,939,872

COUPLING FOR FLEXIBLE HOSE

George K. Bedur, Akron, Ohio, assignor to The B. F. Goodrich Company, New York, N. Y., a corporation of New York Application October 5, 1932. Serial No. 636,270

2 Claims. (Cl. 285—71)

This invention relates to couplings for flexible hose, and is especially useful in the coupling of flexible hose of relatively large cross-section such as is used in pumping and dredging operations. The principal objects of the invention are to provide simplicity of construction, efficient sealing of the joint, and security of fastening, and to provide a construction which will not interfere with the flow of material through the conduit.

Other objects will appear from the following description and the accompanying drawings.

In the drawing:

Fig. 1 is a side elevation of an end portion of a flexible hose embodying one form of the invention, a portion of the hose with its coupling member being broken away and a portion thereof shown in section.

Fig. 2 is a section taken on line 2—2 of Fig. 1.

Fig. 3 is a longitudinal section through a joint between a section of hose and an adjoining conduit, parts being broken away.

Fig. 4 is a view similar to Fig. 3 showing a modification of the invention.

The invention in its broad aspect comprises enlarging or flaring the outer surface of the flexible hose near the end of a section thereof, utilizing the flared wall as a bearing surface for a retaining member, providing a reinforcing support at the enlarged or flared portion to prevent collapse of the hose under the pressure of the retaining member, and providing a sealing face on the hose to engage an adjacent member.

Referring to the drawing, and particularly to Figs. 1 and 2 thereof, the flexible hose, designated by the numeral 10, has the outer surface of its wall enlarged or flared as at 11 to form a seat for a non-expansible retaining ring 12 which is provided with a seating surface 13 to conform therewith. Reduction of the size of the enlarged portion to a substantial degree, or collapse of the hose wall at the coupling, is prevented by a non-compressible reinforcing ring of metal or other material designated by the numeral 14.

The reinforcing ring is preferably incorporated in the thickened wall of the hose where it is protected against corrosion. The hose may be of any ordinary construction and preferably comprises a wall 19 of vulcanized rubber or other resilient material impervious to the fluid to be conducted. In the form shown in Figs. 1 and 2, the hose is reinforced by plies of textile material 15, 16, some of which have their margins cuffed about the reinforcing ring 14, and also by a helical reinforcement 17 of metal.

Where the ring 14 is of L-shape as shown in Fig. 1, a filling 18 of fabric or other light material may also be employed to fill the hollow section. The rubber wall 19 of the hose is preferably extended around the end of the conduit and over the outer surface of the hose as a continuous impervious layer which will protect the reinforcements and will provide a rubber sealing surface, as at 20, to meet an adjoining member. At the sealing surface 20 the rubber may be of increased thickness to provide an efficient seal.

The ring 12 is provided with adjustable fastening devices such as bolts 21 adapted to engage a similar ring 22 or other part of an adjoining fitting to hold the hose 10 in engagement therewith. When the adjoining member is another section of similar hose or a rigid fitting, the adjacent ends may be similar in shape as shown in Fig. 3 and the retaining rings 12 and 22 may be similar in construction. In such a case a sealing surface 20 may be provided at the end of each section, the meeting surfaces being held in engagement with each other under compression by the bolts 21.

Although it is preferred to maintain a uniform uninterrupted bore and to enclose the reinforcing ring within the walls of the hose, the hose may be made with its bore increased adjacent the ends and the ring seated in the enlarged portion of the bore as shown in Fig. 4, so as not to restrict the hose but to provide the desired support. Where two such sections of conduit are to be joined, a ring 23 may be formed at opposite ends to bear against the inner flared walls of the two sections, the flaring of the walls permitting the use of a ring which does not restrict the bore of the hose at the joint.

Additional reinforcing rings 24 may be incorporated in the wall of the hose between the retaining ring 12 and the ring 23 to increase the resistance of the hose to compression adjacent the sealing surface. The ring 24 need not be non-collapsible but may be constructed of cord or fabric.

I claim:

1. The combination of a pair of flexible hose sections having respective end sealing faces in sealing engagement with each other, each of said sections having its outer surface flared adjacent its end sealing face to provide a seat for an axially-impelled retaining structure, a pair of retaining structures seated respectively on the flared surfaces, means holding the retaining members against movement away from each other, and a rigid, non-contractible ring in the end of each hose section providing a positive and unyielding clamping of material of the hose between the ring and the retaining structure.

2. A flexible hose having an end sealing face and adjacent thereto an outer surface flared outwardly toward the end sealing face, a retaining structure seated on the flared surface, a container in communication with the hose and in sealing engagement with the end sealing face thereof, means holding the retaining structure against movement away from the container, and a rigid, non-contractible ring in the end portion of the hose providing a positive and unyielding clamping of material of the hose between the ring and the retaining structure.

GEORGE K. BEDUR.